Sept. 23, 1952 M. A. BERGSTEN ET AL 2,611,279
POWER CONTROL FOR AGRICULTURAL MACHINES
Filed March 31, 1951 3 Sheets-Sheet 1

INVENTORS:
MILFORD A. BERGSTEN
WILLIAM E. CADE
BY
ATT'YS

Sept. 23, 1952   M. A. BERGSTEN ET AL   2,611,279
POWER CONTROL FOR AGRICULTURAL MACHINES
Filed March 31, 1951   3 Sheets-Sheet 2

INVENTORS:
MILFORD A. BERGSTEN
WILLIAM E. CADE
BY
ATT'YS

Sept. 23, 1952  M. A. BERGSTEN ET AL  2,611,279
POWER CONTROL FOR AGRICULTURAL MACHINES
Filed March 31, 1951  3 Sheets-Sheet 3

INVENTORS:
MILFORD A. BERGSTEN
WILLIAM E. CADE
BY
ATT'YS

Patented Sept. 23, 1952

2,611,279

UNITED STATES PATENT OFFICE 2,611,279

POWER CONTROL FOR AGRICULTURAL MACHINES

Milford A. Bergsten, East Moline, and William E. Cade, Moline, Ill., assignors to Deere & Company, Moline, Ill., a corporation of Illinois Application March 31, 1951, Serial No. 218,672

8 Claims. (Cl. 74—242.1)

This invention relates to an agricultural machine and more particularly to improved means for controlling the source of power selectively connectible to and disconnectible from crop-handling mechanism of such machine.

A typical machine of the character referred to is shown in U. S. Patent 2,529,180. This machine is a combine of the usual type coordinating harvesting and threshing operations in one machine. Although the machine illustrated in that patent is of the self-propelled type, it is also conventional to utilize combines drawn by a tractor or other draft source. Such combines are ordinarily provided with their own power plant, usually in the form of an internal combustion engine. The same principles are applicable, insofar as powering of the threshing mechanism is concerned, in the stationary thresher.

The problem with which the present invention is concerned is that of selectively establishing a connection or disconnection between the internal combustion engine and the threshing mechanism. In machines of the character referred to above, the arrangement includes a driving pulley on the crankshaft of the engine and a driven pulley on a shaft that is connected to a rotating part of the threshing mechanism, such as the separator beater. Drive is selectively established or disestablished by means of tightening or loosening a belt trained about the driving and driven pulleys. It is desirable in this respect to utilize a belt-tightener means, such as an idler pulley mounted on a swingable arm, and it is further desirable to coordinate the swingable arm with the throttle or other speed-regulating device for the engine so that when the idler arm is swung to belt-loosening position, the throttle or speed-regulating device will be set at a slow operating position. Conversely, it is desirable that the coordination of the belt-tightener means and the speed-regulating device be such that when the belt is tightened, the speed-regulating device will be set to a position in which it will be determinative of the capacity of the engine to drive the threshing mechanism. Normally, these desirable results may be achieved in part at least by simple linkage interconnecting the belt-tightener means and the speed-regulating device. However, the two or more positions in which the speed-regulating device may be set are relatively constant, whereas the range of movement of the belt-tightener means often varies, because of changes in length of the belt due to weather conditions, for example. Further, as the belt is used, it becomes somewhat longer than when it was new, thus requiring adjustment of the control means therefor. This will in turn require an adjustment of the linkage connecting the belt-tightener means with the speed-regulating device. Since the necessity for adjustment will occur relatively frequently, the situation is one of considerable annoyance to the machine operator. This is true primarily in those cases in which the speed-regulating device includes a governor, in which cases the adjustment is difficult to make.

According to the present invention, the interconnecting means between the belt-tightening device and the speed-regulating device includes provision for overtravel so that even though the range of necessary movement of the belt-tightener device or means changes from time to time, there will be no change in the range of movement of the settable part of the speed-regulating device. It is an important object of the invention to provide the improved means in the form of a simple arrangement that may be readily installed on typical machines of existing designs. It is a specific object of the invention to utilize a swingable arm having a hub which in turn has a frictional connection with an operating element that is in turn connected to the throttle of the speed-regulating device.

Other important objects and desirable features inherent in and encompassed by the invention will become apparent as the disclosure of a preferred embodiment of the invention is fully made in the following detailed description and accompanying sheets of drawings in which Figure 1 is a fragmentary perspective side view of the improved drive and control mechanism applied to a machine of the character referred to above;

Figure 1:
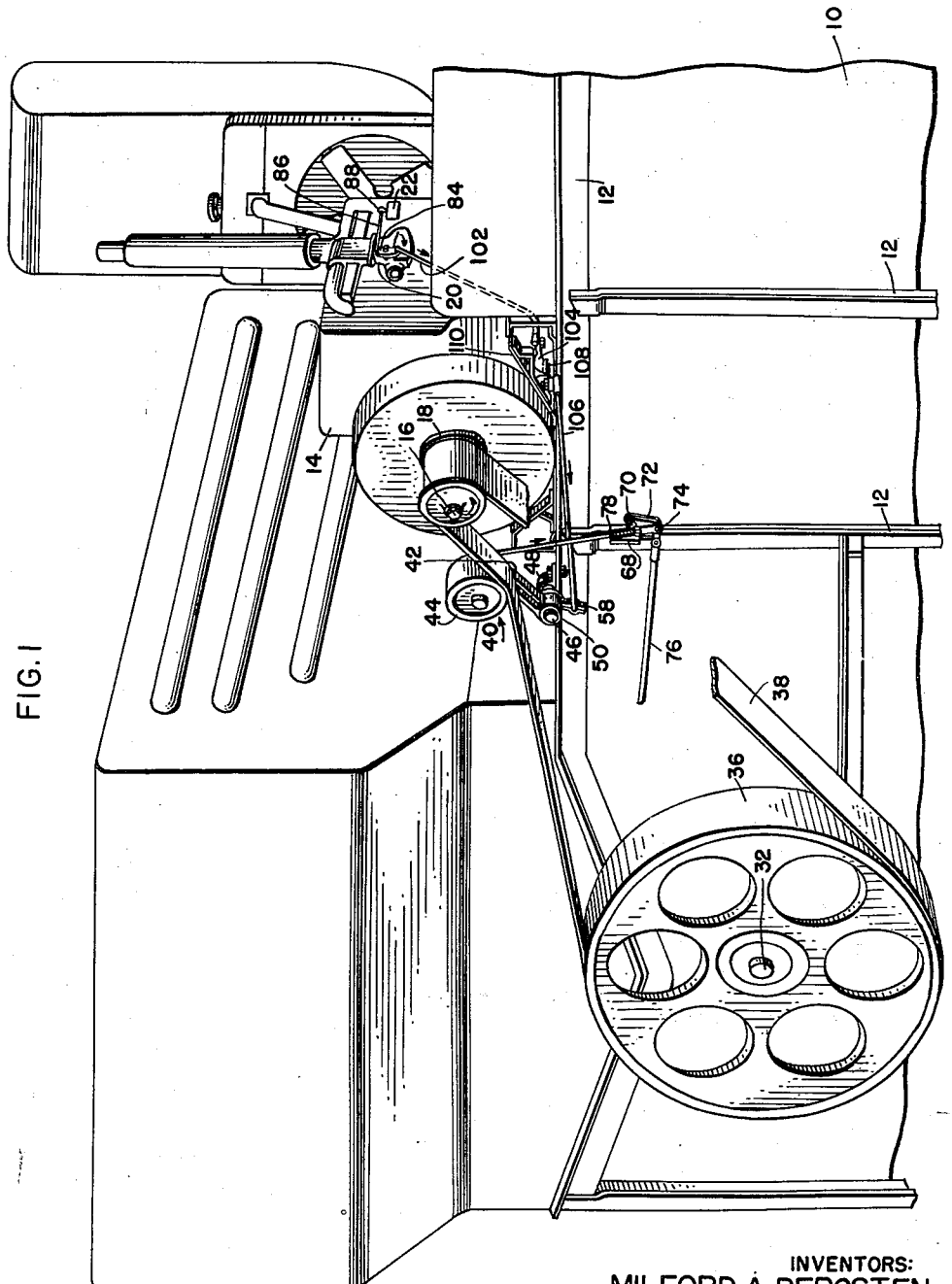

The machine comprises essentially a body 10 having framework 12 which provides supporting structure for a power source, here in the form of an internal combustion engine 14. The rear end of the crankshaft of this engine is designated by the numeral 16, the crankshaft comprising a rotatable driving part on which is keyed a driving pulley 18. The engine may include a conventional carburetor 20 and a governor 22, these two components comprising a speed-regulating device, the details and purposes of which will be set forth below.

The body 10 comprises a separator or threshing housing within which is contained threshing or equivalent crop-handling mechanism. As shown schematically in Figure 6, a threshing cylinder is designated by the numeral 24 and operates in conjunction with a concave 26. A feeder 28 is illustrated as means for supplying the threshing mechanism with grain. Rearwardly of the cylinder 24 is a separator beater 30 carried on a shaft 32 that extends transversely of the body 10 and that projects outwardly at the same side as and parallel to the crankshaft 16 of the engine 14.

Figure 6:
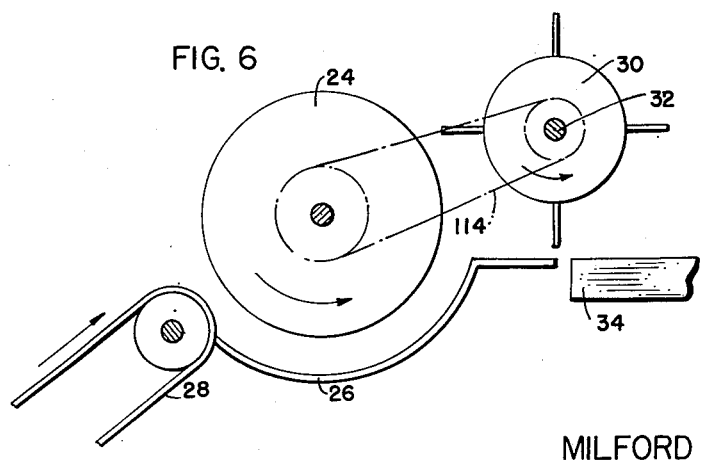
Figure 6 is a schematic view showing a representative form of crop-handling mechanism with which the invention is concerned.

The threshing mechanism shown in Figure 6 may further include a conventional separator rack or sieve 34.

Figure 4:
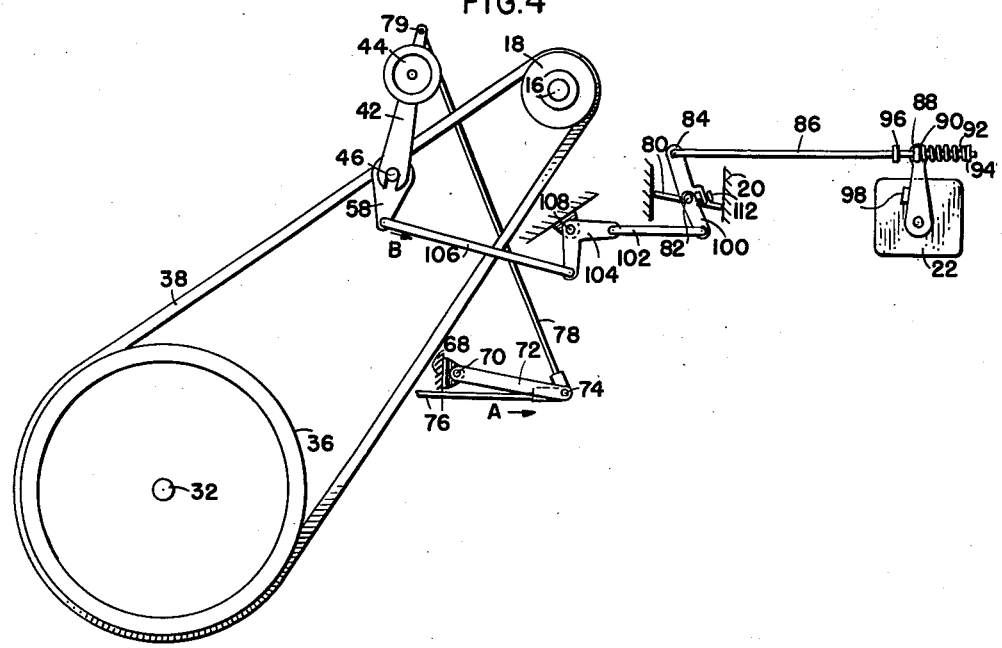
Figures 4 and 5 are schematic views showing the control mechanism in different stages of operation.

The end of the beater shaft 32 that projects at the side of the body 10 has keyed thereto a relatively large driven part in the form of a pulley 36. Means for selectively establishing or disestablishing drive between the driving pulley 18 and driven pulley 36 comprises an endless flat belt 38 and a belt-tightener device designated generally by the numeral 40. As shown in Figure 4, when the belt 38 is loose, the driving pulley 18 may rotate without causing rotation of the driven pulley 36. Conversely, when the belt is tightened, as in Figure 5, drive is established between the two pulleys.

The belt-tightener device comprises a swingable arm 42 on which is rotatably carried an idler pulley 44. The arm 42 is mounted on one of the members of the supporting structure 12 of the body 10 by means including a relatively short pivot member or stub shaft 46 which includes a mounting bracket 48. The pivot member or shaft 46 is thus fixed in position and journals the arm 42 for angular movement by means of a hub 50 preferably formed integrally with the arm.

Figure 2:
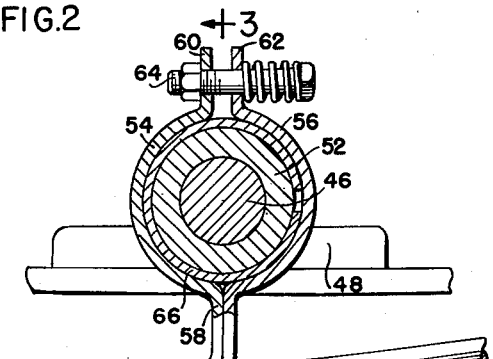
Figure 2 is an enlarged fragmentary sectional view showing the interconnection between the belt-tightener means and one of the control elements for the speed-regulating device.
Figure 3:
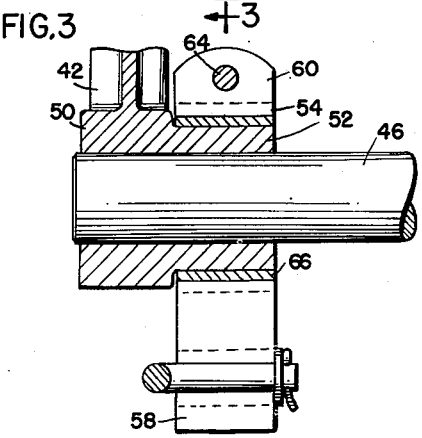
Figure 3 is a fragmentary transverse sectional view taken on the line 3—3 of Figure 2.

As best shown in Figure 3, the hub 50 includes an integral hub extension 52 concentric with and surrounding the shaft 46. The hub extension is encircled by a pair of complementary arcuate portions 54 and 56 of an operating element or lever 58 (Figure 2). The portions 54 and 56 respectively have apertured ears 60 and 62 between which a spring-loaded clamping connection is effected at 64. A band of friction material 66, which may be of any conventional type, encircles the outer surface of the hub extension 52 and is encircled by the inner surface of the element portion 54-56 so as to establish a cooperative frictional connection between the hub 50 and the operating element 58. The connection is such that the element or lever 58 will normally move with the arm 42, except that relative angular movement between the arm and element is permitted when necessary.

Drive-actuating means is provided for effecting swinging of the arm 42 in either direction about its pivot at 46. This means preferably includes a bracket 68 fixed to one of the members of the supporting structure 12 below the belt-tightening device 40. This bracket provides a pivot 70 which carries one end of a pivot link 72. The other end of this link is pivotally connected at 74 to a forwardly extending control rod 76. The connection at 74 also includes a connection to the lower end of a link 78. The upper end of the link 78 is connected to an upper portion of the swinging arm 42, as at 79 in Figures 4 and 5.

The arrangement is such that the linkage 72-78 forms an over-center lock (Figure 5) when the control rod 76 is pulled forwardly to its maximum extent. This will cause the idler arm 42 to swing to its maximum belt-tightening position.

Figure 5:
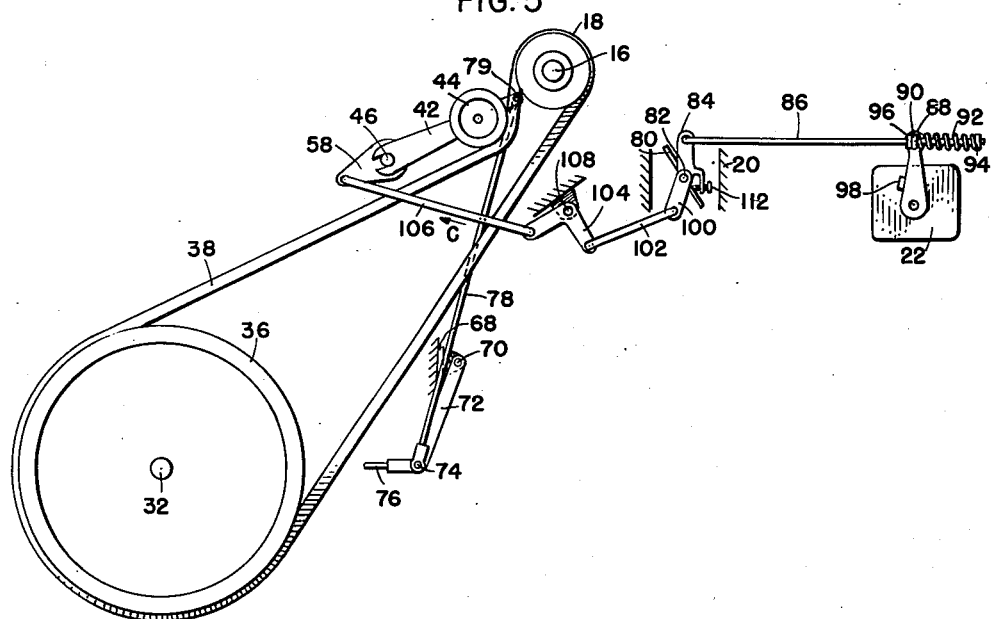

In the schematic illustrations in Figures 4 and 5, the carburetor 20 is shown as having a throttle 80 fixed to a throttle shaft 82. A throttle control arm 84 is fixed to the throttle shaft 82 and has a link connection at 86 with an arm 88 rockably mounted on the governor 22. The governor construction may be conventional and details thereof are omitted. The connection between the link 86 and the governor arm 88 is shown in representative fashion as including an apertured lug 90 on the arm 88 and through which the link 86 loosely extends. A compression spring 92 operates between one side of the lug 90 and a stop 94 on the link 86. A second stop 96 is provided on the link 86 at the other side of the lug 90.

A stop 98 may be provided on the governor housing for limiting the "slow" position of the governor arm 88 (Figure 4). The spring 92 may be slightly compressed so that the throttle 80 may be moved to its closed or "slow idle" position (Figure 4), in which case the governor arm 88 is stopped by the stop 98 and the stop 96 on the link 86 moves to the left from the lug 90 on the governor arm 88.

An operating element or throttle control arm 100 is loosely carried at one end of the throttle shaft 82. The free end of this arm is connected by a link 102 to a bell crank 104 which is in turn connected by a link 106 to the operating arm 58 that is frictionally connected to the idler arm 42. The bell crank 104 is pivoted at 108 on any suitable bracket 110 carried by the supporting structure 12 of the body 10.

A lost-motion connection is effected between the throttle control arm 100 and the throttle control arm 84. Such connection is shown in representative fashion in Figures 4 and 5 as including an adjustable stop 112, carried by the arm 84 and at times engageable with the arm 100.

When the parts are in the "slow idle" position shown in Figure 4, the main control rod 76 has been moved in the direction of the arrow A so that force is transmitted through the connection 50-66 to the operating element 58, which in turn causes movement of the linkage 106-104-102 in the direction of the arrow B. This results in the throttle arm 100 engaging the stop 112 and picking up the throttle arm 84, effecting closing of the throttle 80 and at the same time drawing to the left on the link 86 to move the governor arm 88 to its "slow" position as determined by the stop 98. This movement will, of course, slightly compress the spring 92 so as to temporarily free the throttle from the governor.

When it is desired to engage the drive between the pulleys 18 and 36, the control rod 76 is moved forwardly, or opposite to the direction of the arrow A in Figure 4. This causes reverse swinging of the arm 42 and consequently movement of the rod 106 in the direction of the arrow C in Figure 5. The loose throttle arm 100 is moved on the shaft 82, but the spring 92 between the link 86 and the governor arm 88 causes the other throttle control arm 84 to follow. By the time the linkage 76—74—72—78 reaches the position of Figure 5 to establish the over-center lock, the idler 44 will have sufficiently tightened the belt 38 so as to establish drive between the pulleys 18 and 36. At the same time, the throttle 80 comes under control of the governor 22, since the angular movement of the throttle arm 100 (Figure 5) is sufficient to completely disengage the inter-connection at the stop 112. The position of the throttle in Figure 5 may be said to be a "fast idle" position, in which the speed-regulating device or governor 22 and carburetor 20 cooperate to increase the speed of the engine sufficient to carry the load of the belt 38, pulley 36, shaft 32, and separator beater 30 and the parts connected thereto, one of which is the cylinder 24 as indicated by the dotted-line drive connection 114 in Figure 6. Thereafter, when material is fed to the threshing mechanism, the governor 22 automatically opens the throttle further to increase the capacity of the engine in accordance with the load imposed thereon, as is conventional.

It will be seen from the foregoing that the frictional or over-travel connection between the arm 42 and the operating element 58 is such that in the event that the angular range of movement of the arm 42 becomes greater than that for which the parts are originally set, such overtravel may be permitted without interfering with the adjustment or operation of the speed-regulating device. This result follows because when the stop 96 on the link 86 between the carburetor and governor reaches the position of Figure 5, there is set up a stopped condition determined in part by engine speed and by load imposed on the threshing mechanism. Therefore, the arm 42 may be swung farther in a belt-tightening direction without affecting the governor, since the frictional connection will allow for slippage.

Another characteristic of the frictional connection is that it has sufficient force-transmitting ability to pick up the throttle control linkage immediately. That is, as soon as it is desired to return the idler arm 42 to the position of Figure 4, initial movement of the arm 42 in a counterclockwise direction (as viewed in Figure 4) causes the link 106 to operate through the bell crank 104 and link 102 to immediately move the throttle control arm 100 likewise in a counterclockwise direction until it picks up the throttle arm 84 by means of the stop 112. Since disengagement of the drive by means of releasing the belt 38 via the loosened idler 44 results in lightening of the load on the engine 14, the governor arm 88 will move immediately toward the position determined by the stop 98. Thereafter, the now established connection at 112 between the arms 100 and 84 will be effective to move the throttle to the "slow idle" position of Figure 4.

Various features and important objects of the invention not specifically enumerated herein will undoubtedly occur to those versed in the art, as likewise will numerous modifications and alterations in the preferred embodiment of the invention disclosed, all of which may be accomplished without departing from the spirit and scope of the invention as defined in the appended claims.

What is claimed is:

1. In an agricultural crop-handling machine, the combination of: a crop-handling body including supporting structure; variable speed power means on the body including a rotatable drive pulley; a speed-regulating device connected to the power means and having a control member movable selectively between a first position and a second position determinative respectively of slow and fast rotation of the drive pulley; crop-handling mechanism carried by the body and including a rotatable driven pulley; an endless belt trained about the pulleys and of such length as to require tightening to establish drive between the pulleys; belt-tightner means engageable with the belt; means carrying the belt-tightener means on the body for selective shifting through a range including a first position, in which the belt is loose about the pulleys, and a second position, in which the belt is tight about the pulleys; a first operating element, connected at one end to the control member of the speed-regulating device; a second operating element connected to the first element for movement of the two together to change the position of the control member; and means connecting the second element to the belt-tightener means for moving said elements in accordance with shifting of the belt-tightener means to cause movement of the control member alternatly to its first position or its second position respectively as incidents to shifting of the belt-tightener means to its first or second positions, said connecting means including a frictional force-transmitting connection providing for overshifting of the belt-tightener means beyond the range of shifting thereof required to change the position of the control member.

2. The invention defined in claim 1, further characterized in that: the belt-tightener means includes a swingable arm; the mounting means includes a pivot carrying the arm for swinging; the second operating element is arranged for angular movement about said pivot; and the frictional force-transmitting connection includes cooperative interengaging friction members, one on the arm and one on the second operating element.

3. The invention defined in claim 1, further characterized in that: the belt-tightener means includes a swingable arm having a hub; the mounting means includes a shaft fixed to the body and rockably carrying the hub; the second operating element has a portion encircling the hub; and the frictional force-transmitting connection includes cooperative, interengaging friction members concentric about the axis of the mounting shaft and respectively on the outer surface of the hub and the inner surface of the encircling portion of said second operating element.

4. In an agricultural crop-handling machine, the combination of: a crop-handling body including supporting structure; variable speed power means on the body including a rotatable drive pulley; a speed-regulating device connected to the power means and having a control member movable selectively between a first position and a second position determinative respectively of slow and fast rotation of the drive pulley; crop-handling mechanism carried by the body and including a rotatable driven pulley; an endless belt trained about the pulleys and of such length as to require tightening to establish drive between the pulleys; belt-tightener means engageable with the belt; means carrying the belt-tightener means in the body for selective shifting through a variable range including a first position, in which the belt is loose about the pulleys, and a second position, in which the belt is tight about the pulleys; a first operating element, connected at one end to the control member of the speed-regulating device; a second operating element connected to the first element for movement of the two together to change the position of the control member; and means connecting the second element to the belt-tightener means for moving said elements in accordance with shifting of the belt-tightener means to cause movement of the control member alternately to its first position or its second position respectively as incidents to shifting of the belt-tightener means to its first or second positions, said connecting means including a force-transmitting connection having provision for overtravel of the belt-tightener means beyond the range of shifting thereof required to change the position of the control member.

5. In an agricultural crop-handling machine, the combination of: a crop-handling body including supporting structure; variable speed power means on the body including a rotatable drive pulley; a speed-regulating device connected to the power means and having a control member movable selectively between a first position and a second position determinative respectively of slow and fast rotation of the drive pulley; crop-handling mechanism carried by the body and including a rotatable driven pulley; an endless belt trained about the pulleys and of such length as to require tightening to establish drive between the pulleys; belt-tightener means engageable with the belt; means carrying the belt-tightener means on the body for selective shifting through a variable range including a first position, in which the belt is loose about the pulleys, and a second position, in which the belt is tight about the pulleys; and means connecting the control member to the belt-tightener means for causing movement of the control member alternately to its first position or its second position respectively as incidents to shifting of the belt-tightener means to its first or second positions, said connecting means including a force-transmitting connection having provision for over-travel of the belt-tightener means beyond the range of shifting thereof required to change the position of the control member.

6. In an agricultural crop-handling machine, the combination of: a crop-handling body including supporting structure; variable speed power means on the body including a drive part; a speed-regulating device connected to the power means and having a control member movable selectively between a first position and a second position determinative respectively of slow and fast operation of the drive part; crop-handling mechanism carried by the body and including a driven part; selectively engageable and disengageable drive means between the drive and driven parts; drive-actuating means for actuating the drive means; means mounting the drive-actuating means on the body for selective shifting through a range including a first position, in which the drive means is disengaged, and a second position, in which said drive means is engaged; and means operatively connecting the control member of the speed-regulating device and the drive-actuating means for causing movement of the control member alternately to its first position or its second position respectively as incidents to shifting of the drive-actuating means to its first or second positions, said connecting means including a two-way, force-transmitting connection having provision for overtravel of the drive-actuating means in both directions beyond the range of shifting thereof required to change the position of the control member.

7. For an agricultural machine having a body carrying a variable speed power source driving a drive pulley that is belt-connected to a driven pulley and further including a speed-regulating device for the power source; a belt-tightener and speed-regulating means, comprising: a pivot member having means for fixed mounting thereof on the body of the machine between the pulleys; a swingable arm, having means for engagement with the belt, rockably carried by the pivot to selectively effect loosening and tightening of the belt; an operating element arranged for angular movement about the pivot and connectible to the speed-regulating device; and force-transmitting means interconnecting the arm and element for movement normally together, said force-transmitting means including cooperative, interengaging friction members, one on the arm and one on the element to provide for movement of said arm at times relative to said element.

8. The invention defined in claim 7, further characterized in that: the pivot member comprises a fixed shaft; the swingable arm has a hub loose on the shaft; the element has a portion encircling the hub; and the friction members are concentric about the shaft, one on the outer surface of the hub and the other on the inner surface of the encircling portion of the element.

MILFORD A. BERGSTEN.
WILLIAM E. CADE.

No references cited.